INVENTORS.
RALF WENDTLAND
AUGUST WINSEL
BY
Gerard J. Weser
ATTORNEY.

United States Patent Office 3,576,676
Patented Apr. 27, 1971

3,576,676
GALVANIC FUEL CELL BATTERY AND PROCESS
Ralf Wendtland, Fischbach, Taunus, and August Winsel, Kelkheim, Taunus, Germany, assignors to Siemens Aktiengesellschaft, Berlin and Munich, and Varta Aktiengesellschaft, Frankfurt am Main, Germany
Continuation-in-part of application Ser. No. 545,986, Apr. 28, 1966. This application Dec. 20, 1966, Ser. No. 603,311
Claims priority, application Germany, Dec. 23, 1965, S 101,132
Int. Cl. H01m 27/00
U.S. Cl. 136—86
16 Claims

ABSTRACT OF THE DISCLOSURE

A process for controlling the heat of reaction and the concentration polarization during an electrochemical process which involves maintaining two currents of electrolyte flow through pairs of electrolyte chambers maintained at different pressures. A portion of the electrolyte flows through the electrodes and out of a low pressure electrolyte chamber and another portion of electrolyte flows directly into said chamber and out therefrom. The battery for operating said process.

Figure 1:
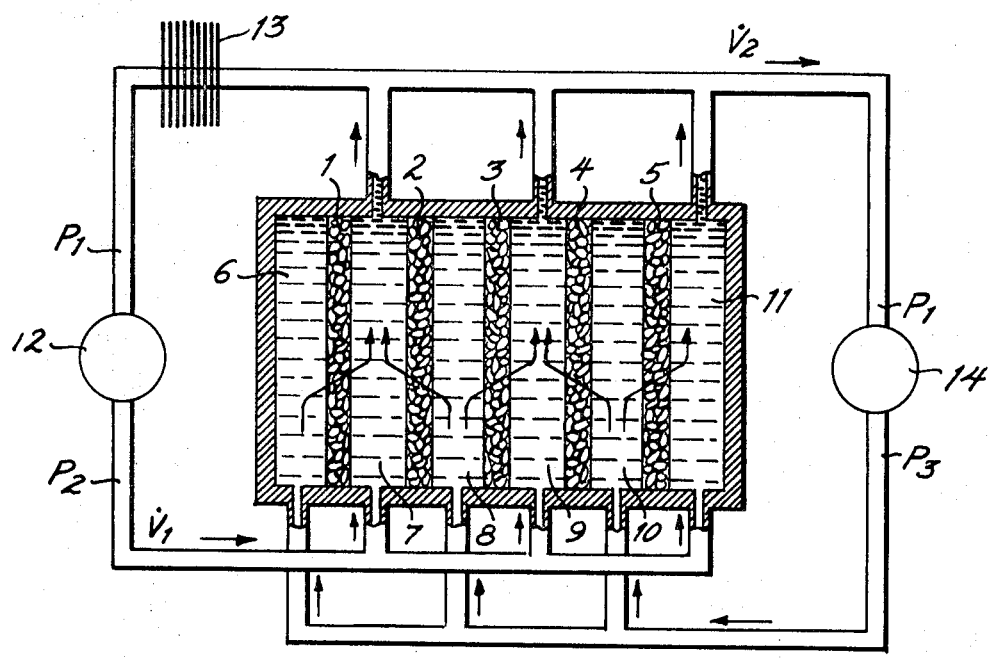

The invention deals with an apparatus and process for cooling a fuel cell battery by removing excess heat developed during its operation, more especially from a fuel cell in which the electrodes are flushed during their operation to minimize concentration polarization. The present invention relates to a fuel cell battery comprising a double circuit flushing system for rinsing the electrodes and to a process for operating it.

In patent application Ser. No. 545,986, filed Apr. 28, 1966, now abandoned, of which this application is a continuation-in-part, there is described a process and a fuel cell battery in which porous electrodes which are operative on both faces, are continuously or intermittently flushed during the operation of the battery. In the apparatus there described, these porous gas diffusion electrodes are arranged as separating walls between each two neighboring electrolyte chambers, and in the process the pores of the electrodes which are not filled with gas are flushed with electrolyte by means of the hydrostatic pressure differential between adjoining electrolyte chambers.

The problem with which the present invention is concerned relates to the undesirable heat of reaction which is developed during the operation of a fuel cell battery. As is known in the operation of a fuel cell or fuel cell battery, a certain amount of heat is liberated in the cell or battery in the course of the electrochemical reaction. This heat will be called hereinafter "reaction heat." This heat should be removed from the cell or battery if it is operated over long periods of time. To deal with this problem, it has been proposed to cool the electrodes by the circulation of the operating gases. It has also been proposed to transfer the reaction heat by circulating the electrolyte through a heat exchanger.

This manner of transferring the reaction heat out of the cell or battery is, however, not possible and cannot be employed in the fuel cells and fuel cell batteries in which the cells and the electrodes are flushed, as described above, during the operation of the cell or battery because each one of the various electrolyte chambers in this type of fuel cell battery is maintained under a different hydrostatic pressure.

It is therefore an object of the present invention to provide a process which permits the flushing or rinsing of the electrodes to remove excess of reaction heat, and at the same time provides for the circulation of the electrolyte for transferring the reaction heat away from the electrodes and out of the system, and for the cooling of the electrodes.

It is another object of the invention to provide a novel fuel cell battery which comprises means adapted for the rinsing of the electrodes by establishing a pressure differential between neighboring electrolyte chambers and electrolyte conducting means which permit the circulation of the electrolyte for the cooling thereof without interfering with the establishing of the pressure differential prevailing between the various chambers for the flushing of the electrodes.

The objects of the invention are achieved by a fuel cell battery which comprises a so-called "dual circuit flushing" system. In these batteries, the flushing of the electrodes is achieved in the above described manner by establishing a pressure differential of electrolyte at the two faces of each electrode, and concurrently therewith by maintaining a flow of electrolyte at only one side, i.e. face of the electrode at a sufficient flow rate to transfer the reaction heat out of the battery. At least part of the electrolyte flow passes at and contacts the electrode face and then moves away therefrom carrying away excess undesirable heat of reaction out of the system.

Likewise, the process is applicable by substituting for the individual electrode a small package of electrodes or individual fuel cells, respectively. Accordingly, the fuel cell batteries of the present invention comprise two systems of electrolyte chambers, one system having a higher hydrostatic pressure and another type having a lower hydrostatic pressure with respect to the first. The chambers in the system which have the lower hydrostatic pressure are the chambers in which the electrolyte is circulated for the cooling of the electrodes. Both types of systems are alternated in the apparatus of the invention. The two systems are in communication with each other through the electrodes: the electrolyte flow being from the system having the higher hydrostatic pressure to the lower pressure system. In the low-pressure system, there prevails two convecting flows of electrolyte, one coming through the porous electrodes and the other from the inlet means. This particular novel arrangement of chambers with two levels of hydrostatic pressures permits the circulation of the electrolyte outside of the battery without interfering with the required pressure differential between neighboring electrolyte chambers and without requiring more than two electrolyte forwarding means operating at different forwarding pressures.

The fuel cell batteries of the invention comprise electrodes or packages of electrodes having arranged between the electrodes or packages of electrodes, electrolyte chambers. One end of every other electrolyte chamber is connected by fluid conducting means, such as tubing or piping, to the outlet portion of electrolyte forwarding means, such as a pump. At prevailing atmospheric pressure $p$, the pump is adapted to produce at its outlet means a high pressure $p_3$, while the other end of said electrolyte chambers are connected to the intake portion of said electrolyte forwarding means. The remaining electrolyte chambers are connected by fluid conducting means, such as piping or tubing, to the outlet portion of a second electrolyte forwarding means, such as a pump, which is adapted to produce at its outlet means a lower pressure $p_2$ in the electrolyte, while the intake portion of said second forwarding means is connected by electrolyte conducting means to the intake portion of said first electrolyte forwarding means.

In the operation of the fuel cell battery of the present invention, a portion of the electrolyte, under a higher pressure (compared to the pressure of the electrolyte in the other electrolyte chambers) is introduced into every other of the electrolyte chambers located between the electrodes or packages of electrodes, and subsequently flowed through the electrodes into the neighboring electrolyte chambers (where the lower pressure prevails), through which, in addition, another portion of electrolyte, which is under a lower hydrostatic pressure, is flowed by the surfaces of the electrodes. Thus, the heat of reaction which developed in and which is prevailing in the electrode is flushed out of the system by the combined effect of the electrolyte currents flowing through and by the electrodes. If desired, this electrolyte is then passed through a heat exchanger to cool it. As stated, the present invention can be utilized best in fuel cell batteries which are operated with liquid electrolyte and in which the gas-filled areas have larger pores than the electrolyte filled areas, and in which the gas diffusion electrodes, which are arranged as separators between neighboring electrolyte chambers, are constantly, temporarily or intermittently rinsed by electrolyte passing through the pores of the electrodes.

It is apparent from the foregoing, that the reaction heat can be effecitvely removed, if only one side of a metal electrode, which is operative on both sides, is cooled by the electrolyte flowing by only one side. The relatively high thermal conductivity of the metal of which the electrodes are constructed results in such efficient heat transfer therein that no significant temperature differential prevails between the two sides of the electrodes. Thus, essentially all the excess reaction heat is removed from the electrode as the heat-removing electrolyte flow passes in front of each side of the electrode to be cooled.

The method of the invention is generally ideally suited for maintaining operative temperatures in the fuel cells below about 100° C., more especially in the range of about 40 to 80° C. Under more demanding conditions, the process may also be operated at temperatures exceeding, at least temporarily, 100° C.

The fuel cell battery and the process of the present invention are illustrated in the attached schematic drawings 1 and 2.

In FIG. 1, numerals 1 to 5 designate gas diffusion electrodes which are operative on both sides. These electrodes are alternately hydrogen electrodes and oxygen electrodes which are fed with the reaction gas from their edges and which are electrically connected in parallel. The gas inlets and the electrical connections are not shown.

The gas diffusion electrodes form porous separation walls between the electrolyte chambers 6 to 11. A current of streaming electrolyte cools one side each of electrodes 1 to 5 and carries the reaction heat to heat exchanger or cooler 13. Pump 12 operates betweenn pressures $p_1$ and $p_2$ and forwards an electrolyte volume $v_1$ per unit of time. In a second circuit, which is connected to the first described circuit, electrolyte is circulated by pump 14; the electrolyte passes from electrolyte chambers 6, 8 and 10 through the electrodes which are rinsed in this manner, into the adjoining respective chambers. Pump 14 operates between the pressures $p_1$ and $p_3$ and forwards, per unit of time, volume $v_2$ of electrolyte through the electrodes. Where $p$ is the atmospheric pressure the pressures in the two circuits are related as follows: $p_1<p_2<p_3$ and the flow rates of the electrolyte are generally related as follows: $v_2 \ll v_1$ because a very slow flow rate of electrolyte through the electrodes is quite sufficient to prevent changes in the concentration in the electrodes to a degree that would interfere with the efficient operation of the battery. Thus, the velocity of electrolyte flow through the electrodes is considerably slower than the flow of the electrolyte which flows at the face of the electrodes without passing through.

Typical values for operating pressures are as follows: $p_1=1$ atmosphere, $p_2=1.01$ atmosphere, and $p_3=1.1$ atmosphere. Of course, other suitable operating pressures may be selected that observe similar relationships.

Figure 2:
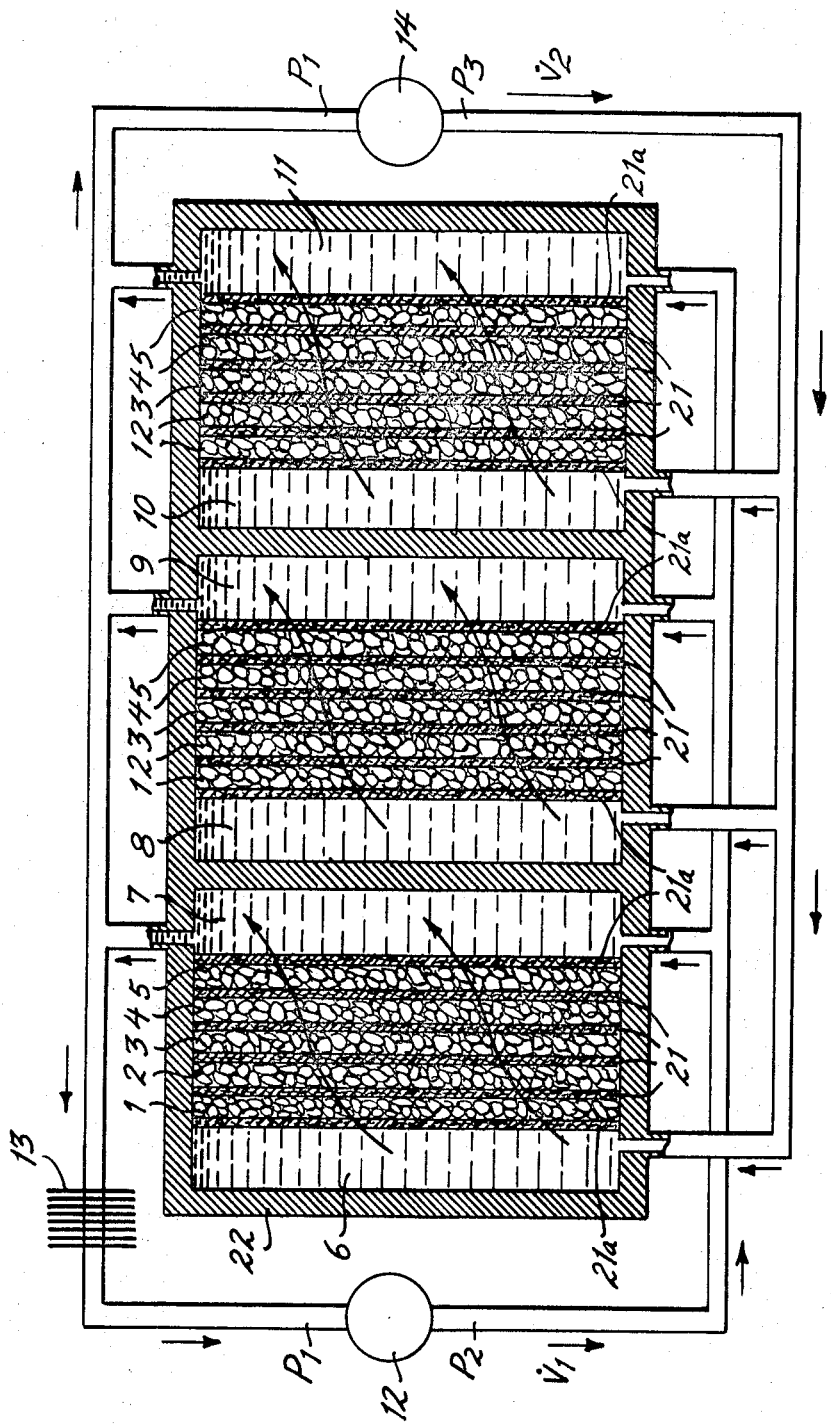

In another embodiment of the battery and process of the present invention which is illustrated in FIG. 2, one may also use instead of each of the electrodes 1 to 5 a block of one or more complete fuel cells shown as 1–5. In this manner, the heat of reaction is removed from the electrodes directly adjoining the electrolyte chambers 7, 9 and 11 by cooling these electrolyte chambers by the circulation of the electrolyte therethrough, in the manner described above. This is made possible by a compact arrangement of the electrodes in the fuel cells or blocks of fuel cells which facilitates the heat transport into said electrolyte chambers or cooling chambers 7, 9 and 11 of the entire battery. The compact arrangement may be achieved in known manner by constructing the cells with closely packed electrodes having sandwiched therebetween porous diaphragm 21. The thickness of the electrodes may thereby be about 1 mm. and the thickness of the diaphragms about 0.3 mm. With these dimensions, the thickness of a cell unit having three electrodes and four diaphragms ranges from about 4 to 5 mm. The cooling chambers 7, 9 and 11 may contain, in addition to the free liquid flowing electrolyte also a solid porous separation diaphragm (as is known) which diaphragm provides support for the neighboring cell blocks and which may, if desired, provide electrical contact and connection between the cell blocks arranged in series. In FIG. 2, 22 represents the housing for the battery; electrodes 1 to 5 are alternatingly hydrogen and oxygen electrodes and 21a represents terminal diaphragms. The oxygen and hydrogen electrodes are electrically, and also with regard to their gas supply, connected in parallel. The electrolyte used for cooling flows through cooler 13, pump 12 and chambers 7, 9 and 11 of the battery. A portion of this electrolyte is tapped by means of device 14 from the main electrolyte stream and flowed through chambers 6, 8 and 10. Because of the pressure drop between chambers 6, 8 and 10, on one side and 7, 9 and 11, on the other, the electrolyte flows through the cell block flushing it. After passing through its cells 1–5 it rejoins the main electrolyte stream in cooling chambers 7, 9 and 11, respectively.

Rotary pump 12 operates at a pressure differential of $p_2-p_1=50$ cm. of a water column and had an output of $v_1=1$ liter per minute. Piston pump 14 operates at a pressure differential of $p_3-p_1=0.3$ atm. and had an output of $v_2=0.5 \cdot 10^{-3}$ liter per minute which indicated the velocity of the electrolyte flow through the electrode block. $p_1$ was 1 atm.

The electrodes were operated under a reaction gas pressure of 1 atmosphere gauge. Each block of cells delivered an electrical current of 20 a. at a voltage of 0.7 so that the battery as a whole delivered 20 a. at a voltage of 2.1. During the operation of the battery the temperature rose and was maintained at 40° C. The electrolyte was 6 N potassium hydroxide. Cooler 13 was cooled by means of a fan.

In the above described cells, the hydrogen electrodes were constructed from 30 g. of a mixture of Raney-nickel (particle size 40 to 60 microns), carbonyl nickel (particle size less than 50 microns) and potassium chloride (particle size less than 70 microns) as pore former in the following weight relationship 1:2:0.5. This powder was shaped in a suitable matrix of 80 mm. of diameter under pressure at 400° C. and 0.5 t./cm.² Two of the three hydrogen electrodes were provided with a porous end diaphragm. These were provided with an additional cover layer of 5 g. of carbonyl nickel (particle size less than 33 microns) which was placed onto the above described working layer. The filler for forming the pores was dissolved out with water.

The oxygen electrodes of the battery of the invention are manufactured from a mixture of 27 g. of Raney-silver (particle size less than 42 microns), carbonyl nickel (particle size less than 50 microns) and sodium carbonate (particle size 70–100 microns) as pore former in the following weight relationship 1:1:0.5. The electrode was formed in a matrix of 80 mm. of diameter and shaped under pressure at 400° C. and 0.5 t./cm.². The filler was also removed with water.

The electrodes were affixed in a 10 mm. wide epoxy container provided with nickel tubing (1-5 mm. diameter) as inlets and outlets for the gas. These inlet and outlet means were so disposed opposite each other with respect to the cells to provide for in- and out-flow of gas through the electrodes. Asbestos diaphragms of a 0.3 mm. thickness and a diameter of 100 mm. were sandwiched in between the electrodes.

A container for the battery was constituted partially by the epoxy frame for the cells and by a polymethacrylic casing held together by suitable bolts.

The distinguishing features of the fuel cell battery of the present invention are, as is set out in the foregoing, the cooling chambers from which the reaction heat is removed by the streaming electrolyte, and the so-called pressure chambers which are arranged between these cooling chambers. The pressure chambers are those electrolyte chambers in which there is maintained a higher pressure than that prevailing in the cooling chambers. Thus, there is created and maintained a current of flowing electrolyte through the electrodes separating the pressure chambers from the cooling chambers.

The maximum number of the electrodes and diaphragms which may be used to form a cell block between each of the cooling chambers and the neighboring pressure chamber depends on the amount of heat generated in the cell block, the dimensions of the electrodes and other components and on other factors. Practical experience has demonstrated that up to ten electrodes and diaphragms, and under very favorable conditions, even more of such elements can be arranged in a single cell block. If the cell block consists of several individual cells, which are electrically connected in series, it is required to provide between each two neighboring individual cells an electrically insulating, electrolyte absorbing porous layer. This layer has a high electrical resistance, is capable of reducing electrical stray currents to a minimum, and at the same time has a low resistance to the flow of the electrolyte to minimize interference with the flushing of the electrodes.

As is readily apparent from the foregoing, the novel fuel cell battery, and the process of the present invention not only increases the electrical output of the fuel cell battery by avoiding the concentration polarization, but also permits the careful control of the heat balance of the battery. Furthermore, the present invention provides for the removal from the electrolyte of the reaction products which are formed in the operation of the battery. This may be performed in suitable means located in the heat exchanger or in another suitable device which may be included in the circuit of the electrolyte.

We claim:

1. In an electrochemical system having a multiplicity of gas diffusion porous electrodes having two operative faces, the electrodes being separated by a multiplicity of electrolyte chambers, each chamber of the pair of neighboring electrolyte chambers being at different pressures and each chamber of the pair being separated by at least one porous gas diffusion electrode, the process for controlling concentration polarization and heat of reaction during electrochemical conversion while passing gas through said electrodes which comprises introducing directly into and flowing electrolyte through and out from every other electrolyte chamber at a relatively low hydrostatic pressure, introducing electrolyte at a relatively high hydrostatic pressure into the other electrolyte chambers and flowing it through the respective electrodes which define the sides of each of said chambers into the adjoining chambers and out from said chambers.

2. The process of claim 1 wherein the electrolyte which flows out of the respective electrolyte chambers is recirculated to all of the electrolyte chambers, a first portion of the electrolyte being recirculated to the chambers which are at the relatively high hydrostatic pressure and a second portion of the electrolyte being recirculated to the chambers which are at the relatively low hydrostatic pressure.

3. The process of claim 2 which comprises cooling the second portion of electrolyte prior to returning the same into said chambers.

4. The process of claim 1 in which the flow rate of electrolyte which flows at the relatively low hydrostatic pressure is sufficient to transfer the reaction heat out of the electrolyte chambers.

5. The process of claim 1 which comprises flowing the electrolyte which has been introduced at the relatively high hydrostatic pressure through a pack of adjoining electrodes and then into the adjoining chambers and out from said chambers.

6. The process of claim 1 which comprises flowing the electrolyte which has been introduced at the relatively high hydrostatic pressure through a pack of adjoining eletcrodes and through porous diaphragms sandwiched between the electrodes of the pack, and then into the adjoining chamber and out from said chambers.

7. In operating a fuel cell having a supply of electrolyte and an electrolyte-permeable electrode body with an upstream face and a downstream face relative to flow of electrolyte therethrough and subject to temperature increase above the temperature of the electrolyte during operation involving the passing of gas through said electrode, the improvement comprising flowing a first portion of the electrolyte from the supply thereof to the electrode body and therethrough from the upstream to the downstream face thereof, flowing a second portion of the electrolyte from the supply thereof directly to and along the downstream face of the electrode body, and collecting both portions of the electrolyte together downstream therefrom.

8. Process of operating a fuel cell according to claim 7 including the steps of cooling the collected electrolyte to remove heat acquired thereby from contact thereof with the electrode body and then redividing the cooled electrolyte into the first and second portions and recirculating the same.

9. Process of operating a fuel cell according to claim 7 wherein the flow of the first portion of the electrolyte is maintained essentially constant and the flow of the second portion of the electrolyte is continuous.

10. Process of operating a fuel cell according to claim 7 wherein the flow of the first portion of the electrolyte is maintained essentially constant and the flow of the second portion of the electrolyte is intermittent.

11. Process of operating a fuel cell according to claim 7 wherein the velocity of flow of the first portion of the electrolyte is maintained less than that of the second portion thereof.

12. A fuel cell battery which comprises a multiplicity of electrolyte chambers which are separated by a multiplicity of porous gas diffusion electrodes, each electrode having two operative faces and gas inlet and gas outlet means, wherein the electrolyte chambers are alternately pressure chambers and cooling chambers, electrolyte inlet means for the pressure chambers, inlet and outlet means for the cooling chambers, electrolyte circulation means for circulating the electrolyte flowing out of the cooling chambers to all of the electrolyte chambers and pumping means for establishing a pressure differential between the electrolyte circulated through the cooling chambers and that circulated through the pressure chambers.

13. The battery of claim 12 in which the cooling chambers are provided with in- and out-electrolyte flow means positioned at approximately opposite sides of the cooling chambers.

14. The battery of claim 12 which comprises at least one block of a multiplicity of porous electrodes, each electrode having two operative faces, said electrodes having sandwiched in-between them a porous diaphragm and said block of porous electrodes and diaphragm being positioned between an electrolyte pressure chamber and an electrolyte cooling chamber.

15. The battery of claim 14 in which the outlet means of each pressure chamber is through the block of porous electrodes and diaphragm, and the electrolyte cooling chamber is provided with in- and out-electrolyte flow means.

16. The battery of claim 12 which comprises electrolyte cooling means positioned outside of the said chambers in connection with the electrolyte means which circulate the electrolyte flowing out of the cooling chambers.

References Cited

UNITED STATES PATENTS

| | | | |
|---|---|---|---|
| 3,227,585 | 1/1966 | Langford et al. | 136—86 |
| 2,925,455 | 2/1960 | Eidensohn et al. | 136—86 |
| 3,201,283 | 8/1965 | Dengler | 136—86 |
| 3,172,784 | 3/1965 | Blackmer | 136—86 |

WINSTON A. DOUGLAS, Primary Examiner

H. A. FLEELEY, Assistant Examiner

U.S. Cl. X.R.

136—159